United States Patent
Eom et al.

(10) Patent No.: US 10,891,073 B2
(45) Date of Patent: Jan. 12, 2021

(54) STORAGE APPARATUSES FOR VIRTUALIZED SYSTEM AND METHODS FOR OPERATING THE SAME

(71) Applicant: RESEARCH & BUSINESS FOUNDATION SUNGKYUNKWAN UNIVERSITY, Suwon-si (KR)

(72) Inventors: Young Ik Eom, Seoul (KR); Hye Ji Lee, Suwon-si (KR); Min Ho Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/364,240

(22) Filed: Mar. 26, 2019

(65) Prior Publication Data

US 2019/0310794 A1     Oct. 10, 2019

(30) Foreign Application Priority Data

Apr. 5, 2018   (KR) .................. 10-2018-0039539

(51) Int. Cl.
*G06F 3/06*     (2006.01)
*G06F 9/455*    (2018.01)

(52) U.S. Cl.
CPC .......... *G06F 3/0656* (2013.01); *G06F 3/0604* (2013.01); *G06F 3/0679* (2013.01); *G06F 9/45558* (2013.01); *G06F 2009/45583* (2013.01)

(58) Field of Classification Search
CPC .................... G06F 9/45558; G06F 2009/45583
See application file for complete search history.

(56) References Cited

U.S. PATENT DOCUMENTS

| | | | | |
|---|---|---|---|---|
| 2008/0109592 | A1* | 5/2008 | Karamcheti | G06F 9/5016 711/103 |
| 2010/0088467 | A1  | 4/2010 | Lee et al. | |
| 2012/0303877 | A1* | 11/2012 | Benhase | G06F 12/123 711/103 |
| 2013/0326119 | A1* | 12/2013 | Lee | G06F 12/0246 711/103 |
| 2017/0024132 | A1  | 1/2017 | Jun et al. | |
| 2019/0220201 | A1* | 7/2019 | Jia | G06F 3/061 |

FOREIGN PATENT DOCUMENTS

| | | |
|---|---|---|
| KR | 10-2010-0037789 A | 4/2010 |
| KR | 10-2012-0035070 A | 4/2012 |
| KR | 10-1381597 B1 | 4/2014 |
| KR | 10-2017-0011350 A | 2/2017 |

OTHER PUBLICATIONS

Lee, Hyeji et al., "Mitigating Write Interference on SSD in Home Cloud Server", *2018 IEEE International Conference on Consumer Electronics (ICCE)*, Jan. 14, 2018 (pp. 844-846).
Korean Office Action dated Sep. 25, 2019 in counterpart Korean Patent Application No. 10-2018-0039539 (8 pages in Korean).

\* cited by examiner

*Primary Examiner* — Edward J Dudek, Jr.
(74) *Attorney, Agent, or Firm* — NSIP Law (57) ABSTRACT

Provided are storage apparatuses for a virtualized system and methods for operating the same. A method for operating a storage apparatus having a write buffer and a memory includes receiving a write request from a virtual machine, identifying a write pattern corresponding to the received write request by comparing a write data size indicated by the write request with a predetermined threshold, and allocating the received write request differently based on the identified write pattern.

19 Claims, 8 Drawing Sheets

STORAGE APPARATUSES FOR VIRTUALIZED SYSTEM AND METHODS FOR OPERATING THE SAME

CROSS-REFERENCE TO RELATED APPLICATIONS

This application claims benefit of priority to Korean Patent Application No. 10-2018-0039539 filed on 5 Apr. 2018 in the Korean Intellectual Property Office, the disclosure of which is incorporated herein by reference in its entirety.

BACKGROUND

Field of the Invention

The present disclosure relates to storage apparatuses for a virtualized system and methods for operating the same.

Related Art

A virtual machine is software that emulates a computer and it is usually a technology that allows another operating system to operate on top of one operating system. Further, a hypervisor, which is a layer between an existing operating system (host operating system) and a virtual machine (guest operating system) on the same, controls guest operating systems to access resources of the host operating system. Therefore, the guest operating systems can access the host's storage device only through the hypervisor layer. In this connection, the hypervisor is also called a virtual machine monitor (VMM).

In this layer structure, each virtual machine does not distinguish input/output (I/O) requests due to a semantic gap between the host and guest systems. Further, because there is a semantic gap between a write buffer of storage and an actual storage, the I/O requests are mixed regardless of a pattern. Therefore, these I/O requests are not efficiently delivered to storage.

As described above, when a plurality of virtual machines are simultaneously executed, a write interference phenomenon occurs between the virtual machines, thereby causing a performance degradation.

To this end, some embodiments of the present disclosure are intended to provide storage apparatuses for a virtualized system and methods for operating the device in order to efficiently improve SLO (Service Level Objective) of each virtual machine by applying a new write buffer policy to a write buffer in a storage apparatus to mitigate performance degradation due to I/O interference between the virtual machines.

Further, some embodiments of the present disclosure are intended to provide storage apparatuses for a virtualized system and methods for operating the device to prevent the write interference between the virtual machines by managing write buffers such that different policies are applied based on write patterns of the virtual machines, to guarantee the SLO of each virtual machine and increase the overall performance of the virtual machine.

In a first aspect of the present disclosure, there is provided a method for operating a storage apparatus having a write buffer and a memory, the method comprising: receiving a write request from a virtual machine; identifying a write pattern corresponding to the received write request by comparing a write data size indicated by the write request with a predetermined threshold; and allocating the received write request differently based on the identified write pattern.

In one implementation of the first aspect, the method may further comprise: when data related to the received write request is stored in the write buffer, allocating the received write request to a storage location of the related data.

In one implementation of the first aspect, the method may further comprise: when a remaining capacity is present in the write buffer, allocating the received write request to the write buffer.

In one implementation of the first aspect, identifying the write pattern corresponding to the received write request may be executed when a remaining capacity is absent in the write buffer.

In one implementation of the first aspect, identifying the write pattern corresponding to the received write request may include: when the write data size indicated by the received write request exceeds the predetermined threshold, identifying the write pattern corresponding to the received write request as a sequential write pattern.

In one implementation of the first aspect, allocating the received write request may include: when the write pattern corresponding to the received write request is identified as the sequential write pattern, allowing the received write request to bypass the write buffer and to be allocated to the memory.

In one implementation of the first aspect, identifying the write pattern corresponding to the received write request may include: when the write data size indicated by the received write request is equal to or smaller than the predetermined threshold, identifying the write pattern corresponding to the received write request as a random write pattern.

In one implementation of the first aspect, allocating the received write request may include: when the write pattern corresponding to the received write request is identified as the random write pattern, allocating the received write request to the write buffer.

In one implementation of the first aspect, allocating the received write request may include: when the write pattern corresponding to the received write request is identified as the random write pattern, deleting data pre-stored in the write buffer and allocating the received write request to a location of the deleted data in the buffer.

In one implementation of the first aspect, allocating the received write request may include: when the write pattern corresponding to the received write request is identified as the random write pattern and when the write buffer is based on Least Recently Used (LRU) policy, deleting data in a LRU position in the write buffer, and allocating the received write request to the LRU position of the deleted data.

In a second aspect of the present disclosure, there is provided a storage apparatus in a virtualized system, the device comprising: a write buffer; a memory; and a controller for controlling the write buffer and the memory, wherein the controller is configured for: receiving a write request from a virtual machine; identifying a write pattern corresponding to the received write request by comparing a write data size indicated by the write request with a predetermined threshold; and allocating the received write request differently based on the identified write pattern.

In one implementation of the second aspect, the controller may be configured for: when data related to the received write request is stored in the write buffer, allocating the received write request to a storage location of the related data.

In one implementation of the second aspect, the controller may be configured for: when a remaining capacity is present in the write buffer, allocating the received write request to the write buffer.

In one implementation of the second aspect, the controller may be configured for: identifying the write pattern corresponding to the received write request when a remaining capacity is absent in the write buffer.

In one implementation of the second aspect, the controller may be configured for: when the write data size indicated by the received write request exceeds the predetermined threshold, identifying the write pattern corresponding to the received write request as a sequential write pattern.

In one implementation of the second aspect, the controller may be configured for: when the write pattern corresponding to the received write request is identified as the sequential write pattern, allowing the received write request to bypass the write buffer and to be allocated to the memory.

In one implementation of the second aspect, the controller may be configured for: when the write data size indicated by the received write request is equal to or smaller than the predetermined threshold, identifying the write pattern corresponding to the received write request as a random write pattern.

In one implementation of the second aspect, the controller may be configured for: when the write pattern corresponding to the received write request is identified as the random write pattern, allocating the received write request to the write buffer.

In one implementation of the second aspect, the controller may be configured for: when the write pattern corresponding to the received write request is identified as the random write pattern, deleting data pre-stored in the write buffer and allocating the received write request to a location of the deleted data in the buffer.

In one implementation of the second aspect, the controller may be configured for: when the write pattern corresponding to the received write request is identified as the random write pattern and when the write buffer is based on Least Recently Used (LRU) policy, deleting data in a LRU position in the write buffer, and allocating the received write request to the LRU position of the deleted data.

In a third aspect of the present disclosure, there is provided a virtualized system comprising: a host operated by a host operating system; a virtual machine operated by a guest operating system, wherein the guest operating system operates on top of the host operating system; a hypervisor located between the virtual machine and the host for controlling a guest operating system accessing a resource of the host operating system; and a storage apparatus having a write buffer and a memory, wherein the storage apparatus is configured for: receiving a write request from a virtual machine; identifying a write pattern corresponding to the received write request by comparing a write data size indicated by the write request with a predetermined threshold; and allocating the received write request differently based on the identified write pattern.

DETAILED DESCRIPTION OF EXEMPLARY EMBODIMENTS

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For simplicity and clarity of illustration, elements in the figures are not necessarily drawn to scale. The same reference numbers in different figures denote the same or similar elements, and as such perform similar functionality.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Figure 1:
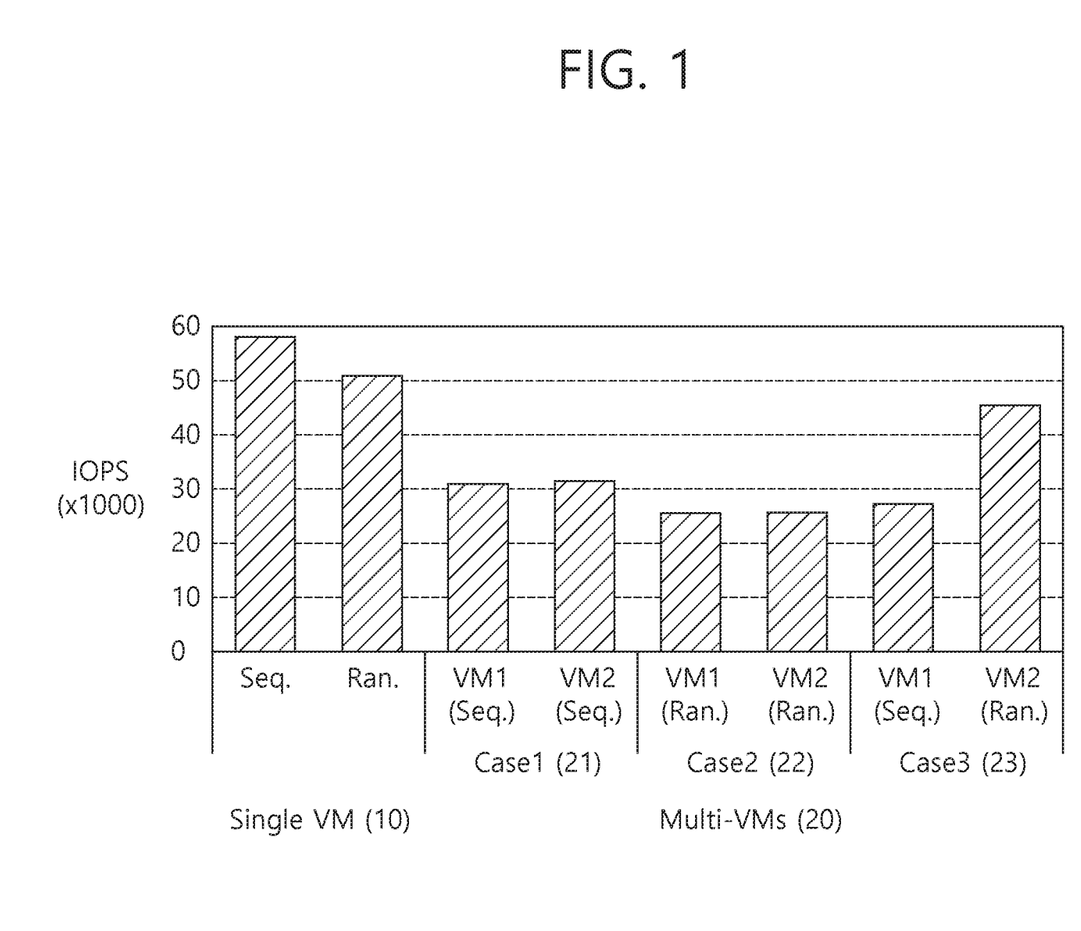
FIG. 1 shows performances of sequential and random workloads in a virtualized environment.

FIG. 1 illustrates performances of sequential and random workloads in a virtualized environment.

To analyze performance overhead due to write interference between virtual machines, experiments were conducted on a conventional virtualized system. Further, the present inventors constructed a virtualized system and created two virtual machines, each having a virtual disk size, and being composed of two vCPUs (virtual CPUs) and 2047 MB of memory. In this experiment, I/O performance of each virtual machine that implements the FIO (Flexible I/O) benchmark was measured. One virtual machine executes a random workload with eight files of size 256 MB, and the other virtual machine executes a sequential workload with a single 5 GB file.

As shown in FIG. 1, in a single virtual machine (single VM) environment 10, the performance of a sequential (Seq.) write pattern is higher at most 14% than the performance of random (Ran.) write pattern. As in Case 1 (21) and Case 2 (22) in FIG. 1, in the environment 20 of multi-virtual machines (Multi-VMs), the VMs exhibit similar performance trends when executing the same pattern workload. However, this result is reversed when the two virtual machines simultaneously execute different workloads for the sequential write workload, and when the two VMs simultaneously execute different workloads for the random write workload.

According to a result of Case 3 (23) shown in FIG. 1, although the virtual machine 1 VM1 executes the sequential write workload, the performance of the virtual machine 1 VM1 is about 40% lower than that of the virtual machine 2 VM2. That is, the SLO of each virtual machine may not be guaranteed in a multi-virtual machine environment. This is because the host sends only the write workload of each virtual machine without considering the write pattern of the host due to the semantic gap between the guest and the host. Further, from a storage level viewpoint, I/O requests from the virtual machines are mixed in the write buffer. Generally, to reduce I/O processing latency, the write work may be held for a while, which may cause delay in I/O processing time. However, when there is no free space in the write buffer, the performance benefit of the write buffer may be lost. This problem appears in Case 3 (23) in FIG. 1.

Even when VM1 requests write operations with sequential write pattern, corresponding performance benefit does not be ensured because the different pattern from VM2 is reflected on the flash memory. In other words, when the write buffer is full, it reflects the write operations of VM2 with random pattern on the flash memory to allocate space in the write buffer for the write operations of VM1. For more detailed analysis of I/O pattern in the host, the present inventors also collected I/O traces of sequential write workload and random write workload by using blktrace tool. The I/O traces show that random write workload generates small-size I/O requests, whereas the size of I/O requests generated by sequential write workload are relatively large.

Figure 2:
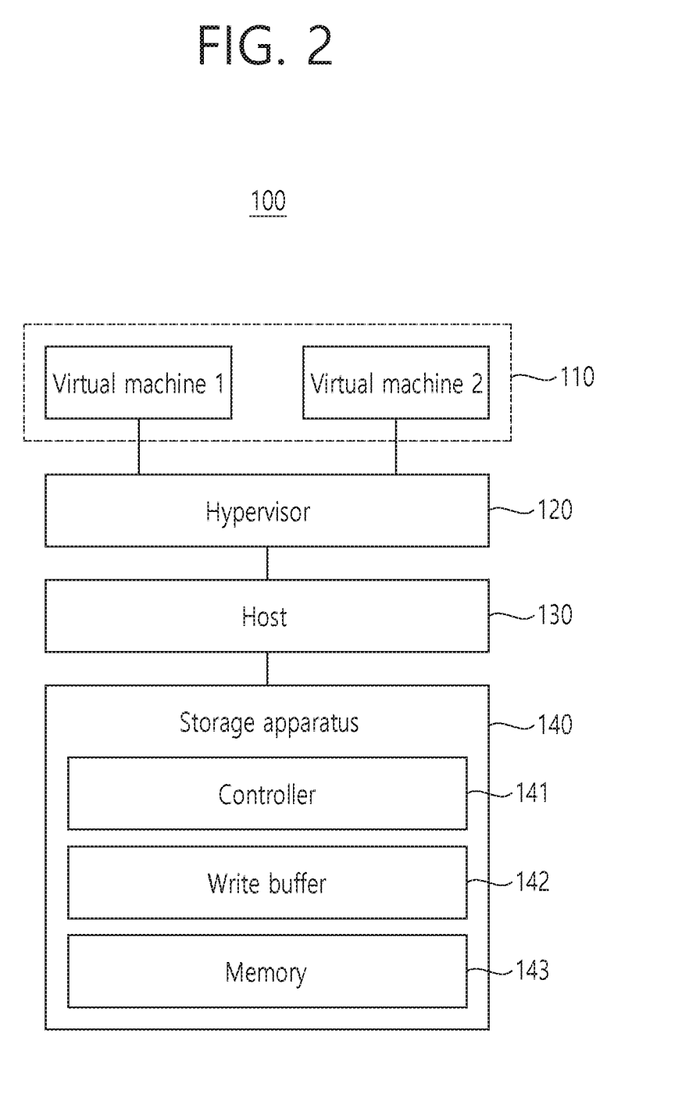
FIG. 2 shows a configuration of a virtualized system according to one example embodiment of the present disclosure.

FIG. 2 shows a configuration of a virtualized system according to one example embodiment of the present disclosure.

As shown in FIG. 2, a virtualized system 100 according to one example embodiment of the present disclosure includes virtual machines 110, a hypervisor 120, a host 130, and a storage apparatus 140. However, not all of the components as shown are required components. The virtualized system 100 may be implemented by more components than the illustrated components, or the virtualized system 100 may be implemented by fewer components than the illustrated components.

A specific configuration and operation of each component of the virtualized system in FIG. 2 will be described below.

The virtual machines 110 may be operated by a guest operating system operating on top of the host operating system. The virtual machine 110 may include a plurality of virtual machines. For example, the virtual machine 110 may include a virtual machine 1 and a virtual machine 2.

The host 130 is operated by the host operating system. The host 130 cannot distinguish a sequential write pattern from a random write pattern due to a semantic gap. Therefore, the storage apparatus 140 may distinguish a write request pattern by setting a write workload size indicated by a write request as a reference.

The hypervisor 120 is located between the virtual machine 110 and the host 130 and controls the guest operating system accessing resources of the host operating system.

The storage apparatus 140 includes a write buffer 142 and a memory 143. The write buffer 142 according to one example embodiment of the present disclosure may perform a write buffer work based on the LRU (Least Recently Used) policy. Because the write buffer 142 uses the LRU write buffer policy, the performance advantage of the write buffer 142 using the LRU policy may be equally used.

Thus, the storage apparatus 140 according to one example embodiment of the present disclosure may first use the LRU scheme used in a conventional write buffer to ensure a high hit ratio. However, in an embodiment of the present disclosure, the write buffer scheme is not limited to the LRU scheme. Various write buffer schemes may be applied. The Least Recently Used (LRU) scheme is a scheme based on a fact that a recently referenced page is likely to be referenced later. This scheme sends downwards a page that has not been referenced for the longest time to storage.

The storage apparatus 140 compares a write data size indicated by the write request received from the virtual machine 110 via the hypervisor 120 and the host 130 with a predetermined threshold, and distinguishes the write pattern of the received write request. As used herein, the write data size indicated by the write request indicates a size of write data corresponding to the write request received from the virtual machine 110 via the hypervisor 120 and the host 130. The storage apparatus 140 allocates the received write requests differently according to the distinct write patterns. In this connection, allocating differently means allocating the write data corresponding to the received write request to be selectively stored in the write buffer 142 or memory 143 according to the write pattern of the write request.

The threshold to be compared with the write data size indicated by the write request may be a criterion for distinguishing the write pattern. The criterion has been predetermined through an experiment according to the embodiment of the present disclosure. A write request whose write data size is larger than the predetermined threshold may be considered a sequential write pattern and may be processed on the storage apparatus based on a sequential write pattern. On the other hand, a write request whose write data size is smaller than the predetermined threshold may be treated as a random write pattern and processed on the storage apparatus 140 based on the random write pattern. As such, the storage apparatus 140 according to one example embodiment of the present disclosure may identify the write pattern based on the size of the workload indicated by the write request. Thus, the device 140 may resolve the conventional problem that the write pattern is not identified due to the semantic gap between the virtual machine and the storage apparatus. Because the write data size of the sequential write request is larger than the write data size of the random write request, the storage apparatus 140 may apply different policies based on distinguishing between the write patterns via the write data size indicated by the write request.

As shown in FIG. 2, the storage apparatus 140 according to one example embodiment of the present disclosure includes a controller 141, a write buffer 142, and a memory 143. However, not all of the components shown are required components. The storage apparatus 140 may be implemented by more components than the components shown, or the storage apparatus 140 may be implemented by fewer components than the components shown.

A specific configuration and operation of each component of the storage apparatus of FIG. 2 will be described below.

The memory 143 may write the received data to the storage apparatus 140 or erase the written data. The memory 143 may be a flash memory.

The write buffer 142 temporarily stores data to be written to the memory 143 or data read from the memory 143.

The controller 141 manages the write buffer 142 and the memory 143. The controller 141 compares the write data size indicated by the write request received from the virtual machine 110 via the hypervisor 120 and the host 130 with a predetermined threshold to distinguish the write pattern of the received write request. The controller 141 may allocate the received write requests differently according to the different write patterns.

When the data related to the received write request is stored in the write buffer 142, the controller 141 may allocate the received write request to the storage location of the related data. The controller 141 may allocate the received write request to the write buffer 142 when the write buffer 142 has a remaining capacity. When there is no remaining capacity of the write buffer 142, the controller 141 may compare the write data size of the received write request with a predetermined threshold to distinguish the write pattern thereof.

Then, when the write data size indicated by the received write request exceeds the predetermined threshold, the controller 141 determines that the write pattern is distinguished as a sequential write pattern. Thus, when the distinct write pattern is the sequential write pattern, the controller may bypass the write buffer 142, and allocate the write request to the memory 143. When the write data size indicated by the received write request is below or equal to the predetermined threshold, the controller 141 determines that the write pattern is distinguished as a random write pattern. When the distinct write pattern is the random write pattern, the controller 141 may allocate the received write request to the write buffer 142. If the distinct write pattern is the random write pattern, the controller may delete data previously stored in the write buffer 142, and allocate the received write request to the deleted data region. For example, when the identified write pattern is the random write pattern and the write buffer 142 is based on LRU (Least Recently Used) scheme, the data in the LRU location may be deleted from the write buffer 142 and the received write request may be allocated to the LRU location of the deleted data Thus, an embodiment of the present disclosure relates to a storage apparatus for buffer management and a method for operating the same, in which in a multiple virtual machines environment, each virtual machine may satisfy the SLO for I/O performance. An embodiment of the present disclosure may allow a write request having a sequential write pattern to bypass the write buffer 142 when there is no remaining space in the write buffer 142, thereby to mitigate the write interference problem that results in performance degradation.

Embodiments of the present disclosure may solve following two problems. A first problem is related to the semantic gap in the virtualized system. Because of the semantic gap between the guest operating system and the host operating system, the host system cannot distinguish between the write request patterns of the virtual machines and passes the write requests to the storage. At the storage level, the storage simply performs the write request without identifying the pattern thereof. A second problem is related to an inefficient write buffer management scheme. The SSD suspends the write request with considering only the performance advantage of the write buffer. For this reason, when there is no free space in the write buffer and the system want to perform a write request of the sequential pattern sent from the host, the write request of the random write pattern into the write buffer may be reflected to the memory. Thus, the opposite performance appears.

To solve this problem, the storage apparatus 140 according to one example embodiment of the present disclosure uses the LRU (Least Recently Used) policy. This may be a conventional write buffer management scheme based on the temporal locality of the data. The storage apparatus 140 according to one example embodiment of the present disclosure may select data of the LRU position that has not been accessed for the longest time in the write buffer 142 as a target data to be removed from the write buffer 141 for the write request when there is no free space in the write buffer 142. The storage apparatus 140 according to one example embodiment of the present disclosure reflects a delete request to allocate a new write request to the write buffer 142. Thus, the storage apparatus 140 according to one example embodiment of the present disclosure may use the conventional write buffer management scheme as it is.

The storage apparatus 140 according to one example embodiment of the present disclosure may process a write request of a sequential pattern when there is no space in the write buffer 142. In order to satisfy the SLO for I/O performance of each virtual machine, the storage apparatus 140 may determine whether the write request should bypass the write buffer 142. The storage apparatus 140 may determine the write pattern and determine the write data size indicated by the write request 142 which should bypass the write buffer 142. Thus, when the write data size indicated by the write request exceeds a predetermined threshold, the storage apparatus 140 may determine that the write request is the sequential write pattern and the request bypasses the write buffer. In this manner, the pattern of the write request sent from the host may match the pattern of the write request reflected on the flash memory.

Hereinafter, a brief description will be given of a method for operating the storage apparatus. When the host 130 sends the write request to the storage apparatus 140, the storage apparatus 140 according to one example embodiment of the present disclosure may first check whether the write buffer 142 is full. If the write buffer 142 is not full, the storage apparatus 140 may simply assign a write request to the write buffer 142 regardless of the type of the write request pattern. When the write buffer 142 is full, the storage apparatus 140 may identify the write data size indicated by the write request to determine whether the write request should bypass the write buffer 142. When the write data size indicated by the write request is greater than the threshold, the write request is considered a sequential write pattern and bypasses the write buffer 142. To the contrary, when the write data size indicated by the write request is below or equal to the threshold, the storage apparatus may assign the write request to the write buffer because the write request is processed in a random write pattern. At this time, since the write buffer 142 does not have enough space to allocate the write request thereto, the storage apparatus 140 may remove data at the LRU location and add the write request of the random write pattern to the removed data region in the write buffer 142.

Figure 3:
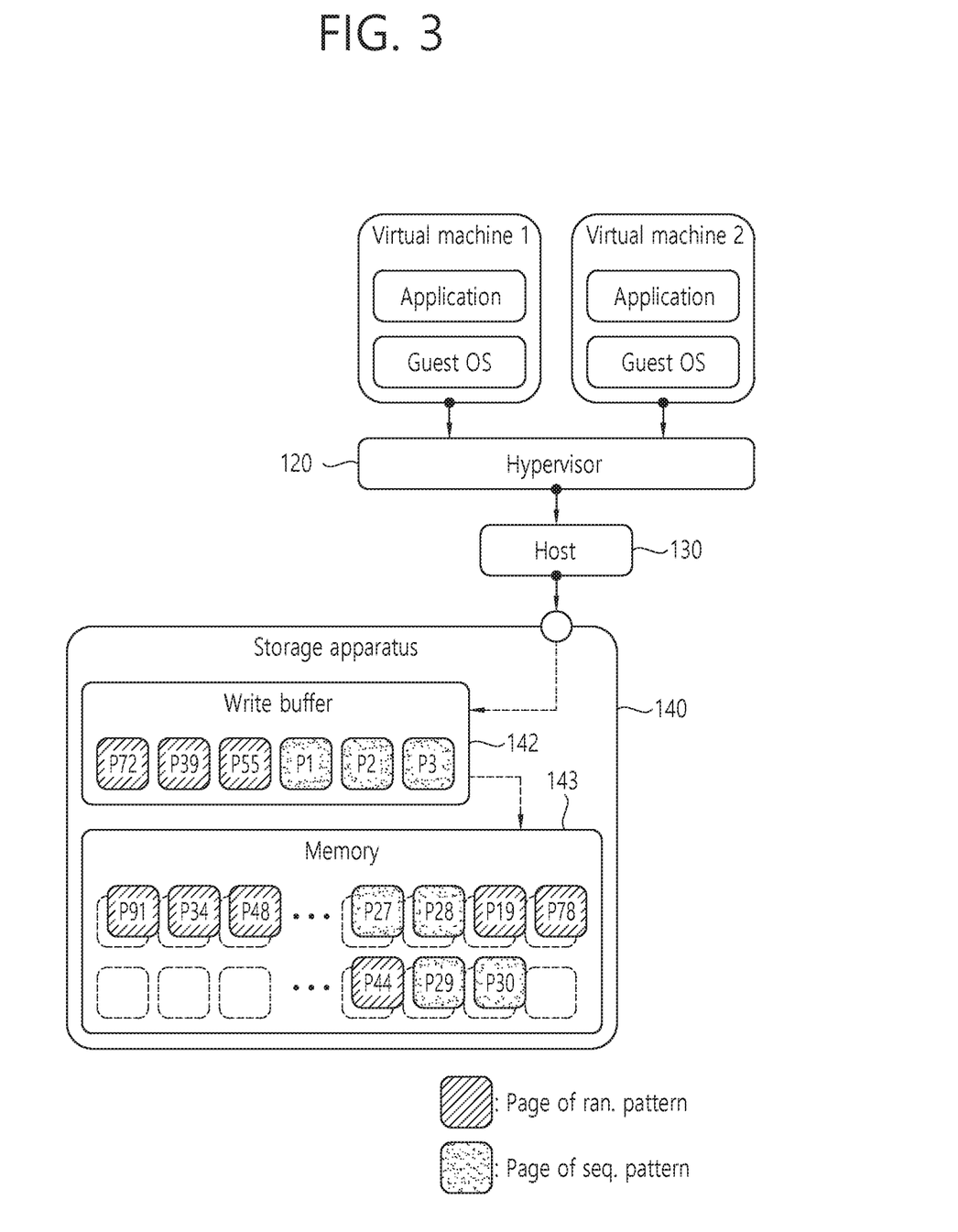
FIG. 3 and FIG. 4 are diagrams illustrating processing procedures of a write request in a conventional virtualized system and in a virtualized system according to one example embodiment of the present disclosure, respectively.
Figure 4:
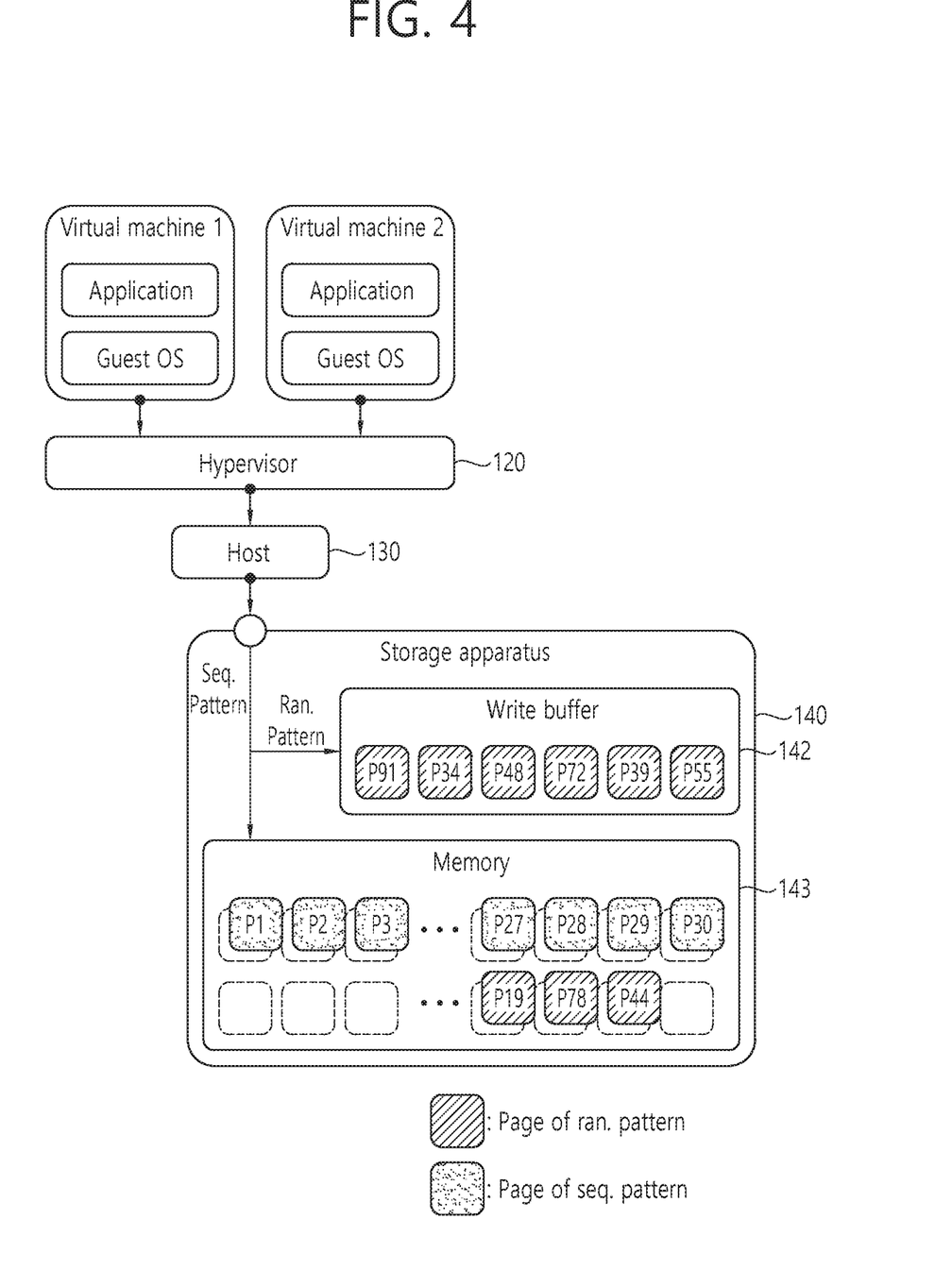

FIG. 3 and FIG. 4 are diagrams illustrating processing procedures of a write request in a conventional virtualized system and in a virtualized system according to one example embodiment of the present disclosure, respectively.

In the conventional virtualized system, the write buffer 142 is allocated and used without distinguishing between the sequential write and random write patterns. However, when different patterns are mixed in the write buffer 142, performance interference phenomenon occurs. Therefore, the system cannot perform the performance desired by the user.

As shown in FIG. 3, it may be seen that data in the two patterns are mixed in the write buffer 142. For example, pages of the random write pattern P72, P39 and P55 and pages P1, P2 and P3 of the sequential write pattern are mixed in the write buffer 142.

However, as shown in FIG. 4, the storage apparatus 140 according to one example embodiment of the present disclosure compares the write data size indicated by the write request with the predetermined threshold. Then, the write request is distinguished between the sequential write pattern or the random write pattern based on the comparison by the device 140. In this connection, the sequential write patterns bypass the write buffer 142, and the random write pattern uses the write buffer 142. As a result, it may be seen that the write buffer of FIG. 4 does not contain data of the two patterns as mixed. For example, pages of the random write pattern P72, P39, P55, P91, P34, and P48 are only present in the write buffer 142. On the other hand, pages of the sequential write pattern P1, P2, P3, P27, P28, P29, and P30 are present in the memory 143. Thus, a more frequently-accessed random write pattern utilizes the write buffer 142. On the other hand, the sequential write pattern, which is accessed relatively infrequently may bypass the write buffer 142. It may be seen that the overall higher performance is measured.

Figure 5:
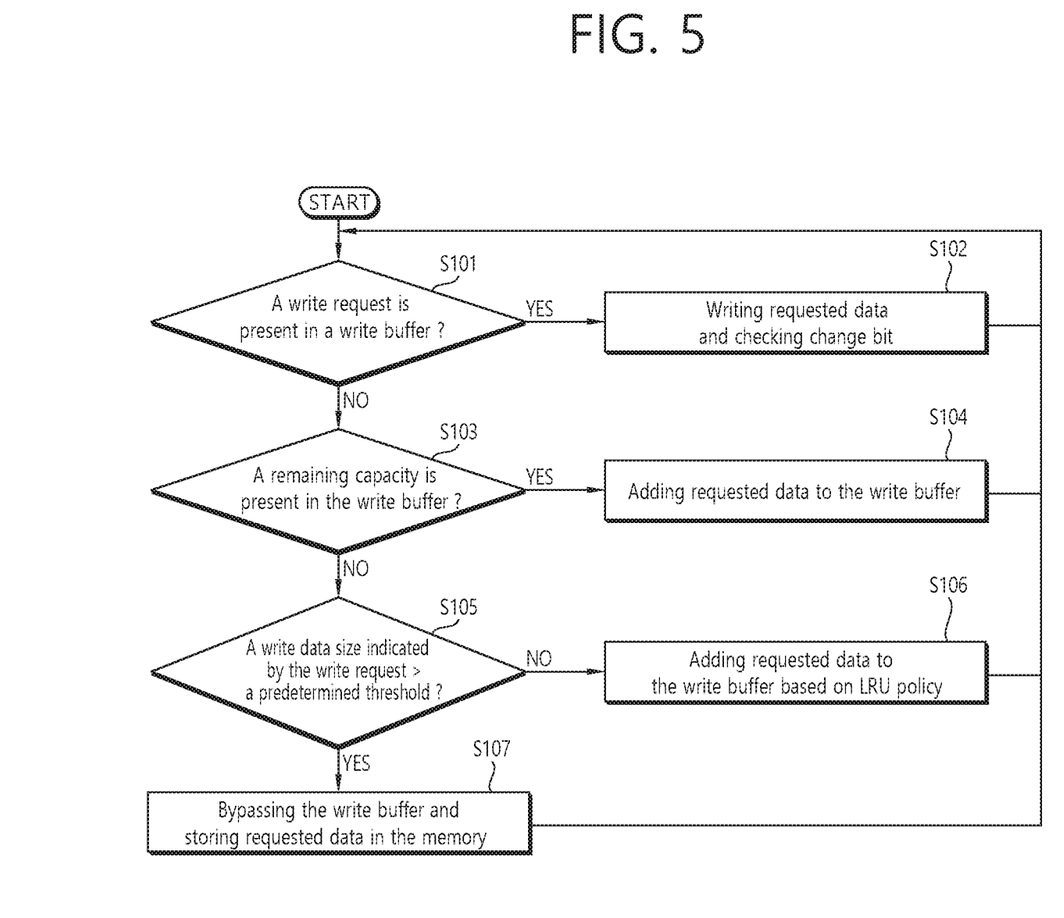
FIG. 5 is a flow chart illustrating a method for operating a storage apparatus for a virtualized system according to one example embodiment of the present disclosure.

FIG. 5 is a flow chart illustrating a method for operating a storage apparatus in a virtualized system according to one example embodiment of the present disclosure.

In operation S101, the storage apparatus 140 checks whether the write request is in the write buffer 142. When the write request occurs, the storage apparatus 140 may first check whether the write request is in the write buffer 142.

When it is determined in operation S101 that the write request is in the write buffer 142, in operation S102, the storage apparatus 140 writes the write requested data and checks a change bit. When the write request is present in the write buffer 142, the storage apparatus 140 may write data corresponding to the write request and check the change bit for effective performance. Then, the storage apparatus 140 performs the process again from operation S101.

On the other hand, when the write request is not in the write buffer 142, in operation S103, the storage apparatus 140 checks whether the write buffer 142 has a remaining capacity. That is, if there is no data related to the request in the write buffer 142, the device 140 may also check a current status of the write buffer 142. The storage apparatus 140 may first calculate the remaining capacity of the write buffer 142 to determine if the write buffer 142 is full.

If it is determined in operation S103 that the remaining capacity is present in the write buffer 142, in operation S104, the storage apparatus 140 adds the write requested data to the write buffer 142. That is, when a capacity remains in the write buffer 142, the storage apparatus 140 may allocate the write request to the write buffer 142 regardless of the type of the write request pattern in order to take advantage of the write buffer 142. When the write buffer 142 has a free space, the storage apparatus 140 may reflect the write request into the write buffer 142 to maximize the use of the write buffer 142, regardless of whether the sequential or random write pattern. Then, the storage apparatus 140 performs the process again from operation S101.

On the other hand, when there is no remaining capacity in the write buffer 142, in operation S105, the storage apparatus 140 determines whether the write data size indicated by the write request exceeds a threshold. That is, when the write buffer 142 is full, the storage apparatus 140 may compare the write data size indicated by the write request with the threshold. That is, the storage apparatus 140 may compare the write data size indicated by the write request with the predetermined threshold. Thus, when the write buffer 142 does not have the free space, the storage apparatus 140 may apply different policies based on sequential write and random write patterns.

When, as a result of the determination S105, the write data size indicated by the write request does not exceed the threshold, in operation S106, the storage apparatus 140 adds the write requested data to the write buffer 142 based on the LRU policy. That is, when the write data size indicated by the write request is smaller than the threshold, the storage apparatus 140 considers the write request as the random write pattern to evict the data at the LRU location in the buffer. The storage apparatus 140 then allocate a new write request into the write buffer 142. When the write data size indicated by the write request is smaller than the threshold, the storage apparatus 140 may consider the write request as a random write pattern and allocate the write request to the write buffer 142 using the LRU policy. Then, the storage apparatus 140 performs the process again from operation S101.

On the other hand, when the write data size indicated by the write request exceeds the threshold, in operation S107, the storage apparatus 140 bypasses the write buffer 142 and stores the write request data in the memory 143. That is, when the write data size indicated by the write request is greater than the threshold, the storage apparatus 140 may consider the write request to be a sequential write pattern and pass the write buffer 142. That is, when the write data size indicated by the write request is greater than the threshold, the storage apparatus 140 may determine the write request as a sequential write pattern and allocate directly the request to the memory 143 without going through the write buffer 142.

Figure 6:
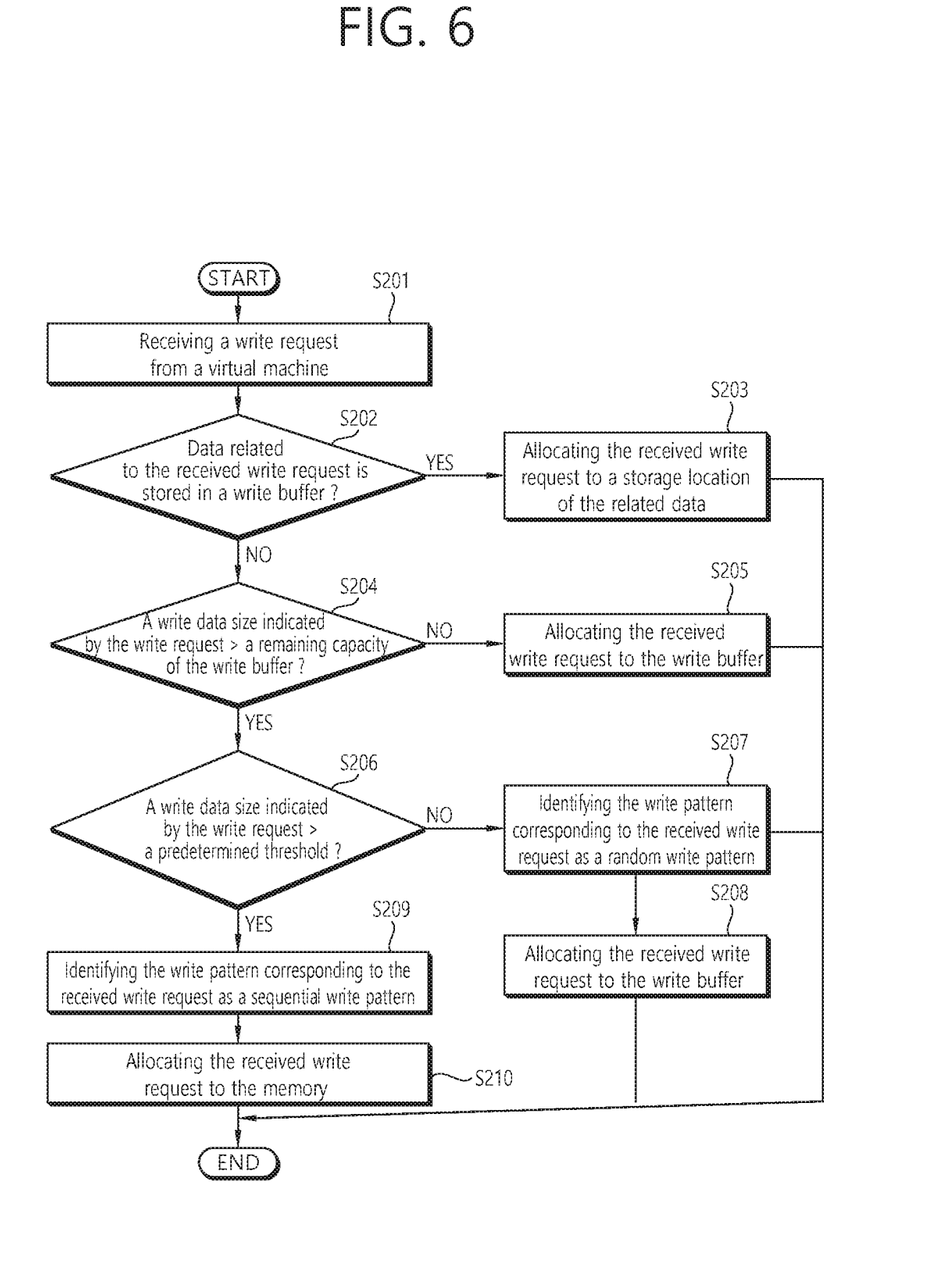
FIG. 6 is a flowchart illustrating a method of operating a storage apparatus for a virtualized system according to another example embodiment of the present disclosure.

FIG. 6 is a flowchart illustrating a method of operating a storage apparatus in a virtualized system according to another embodiment of the present disclosure.

In operation S201, the storage apparatus 140 receives a write request from the virtual machine 110 via the hypervisor 120 and the host 130.

In operation S202, the storage apparatus 140 checks whether the data related to the write request is stored in the write buffer 142.

When it is determined in operation S202 that the data related to the write request is stored in the write buffer 142, in operation S203, the storage apparatus 140 allocates the write request to a data storage location.

On the other hand, when the data associated with the write request is not stored in the write buffer 142, in operation S204, the storage apparatus 140 checks whether the write data size indicated by the write request exceeds the remaining capacity of the write buffer 142. When the write data size indicated by the write request does not exceed the remaining capacity of the write buffer 142, in operation S205, the storage apparatus 140 allocates the write request to the write buffer 142.

On the other hand, when the write data size indicated by the write request exceeds the remaining capacity of the write buffer 142, in operation S206, the storage apparatus 140 checks whether the write data size indicated by the write request exceeds the predetermined threshold.

When it is determined in operation S206 that the write data size indicated by the write request does not exceed the predetermined threshold, in operation S207, the storage apparatus 140 distinguishes the write request pattern as a random write pattern.

Then, in operation S208, the storage apparatus 140 allocates the write request to the write buffer 142.

On the other hand, when the write data size indicated by the write request exceeds the predetermined threshold, in operation S209, the storage apparatus 140 distinguishes the write request pattern as a sequential write pattern.

Then, in operation S210, the storage apparatus 140 allocates the write request to the memory.

Figure 7:
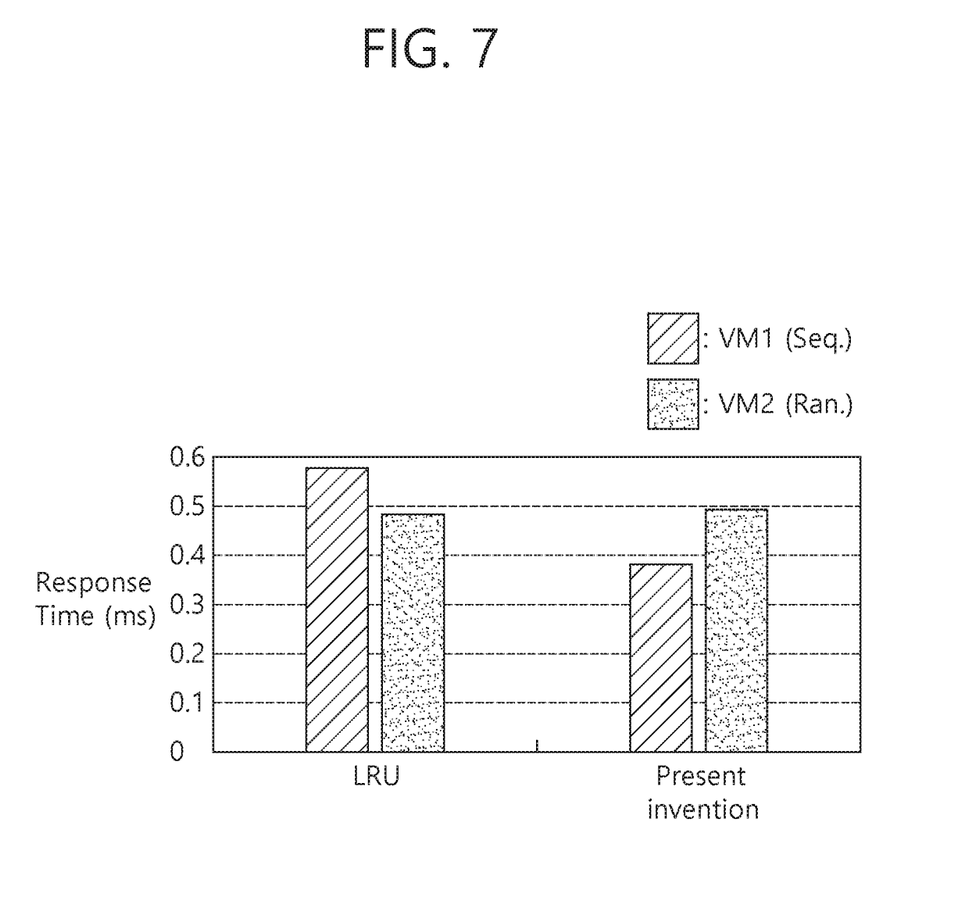
FIG. 7 is a diagram illustrating a comparison between response times in a conventional LRU scheme and in a scheme according to another example embodiment of the present disclosure.

FIG. 7 illustrates a comparison between response times for the conventional LRU scheme and a scheme according to one example embodiment of the present disclosure.

To demonstrate the effect of the scheme in accordance with one example embodiment of the present disclosure over the conventional LRU scheme, the present inventors have implemented a simulator with an SSD patched on Disksim and an additional write buffer simulator. We also collected I/O trace as an input file of our simulator by using blktrace tool while each VM runs FIO benchmark, one with sequential write workload and the other with random write workload. Then, we measured the performance of SSD with the output traces which are derived by the Present invention and the conventional LRU scheme. The size of disk buffer cache is configured to 32 MB, which is 0.1% of the storage capacity of Disksim.

As shown in FIG. 7, in the write buffer using the conventional LRU scheme, the response time of the virtual machine 1 VM1 that performs the sequential (Seq.) write is 20% larger than the response time of the virtual machine 2 VM2 performing the random (Ran.) write. That is, the performance of the virtual machine 1 VM1 performing the sequential write is measured to be lower than that of the virtual machine 2 VM2 performing the random write. This is because the storage processes the write requests inefficiently without considering the write pattern variation due to the semantic gap between the host and storage.

On the other hand, in one example embodiment of the present disclosure, the response time of the virtual machine 1 VM1 is about 22% smaller than the response time of the virtual machine 2 VM2. The result is due to the fact that the write request of the virtual machine 1 is identified as a sequential write pattern according to the requested data size, and bypasses the write buffer when necessary, so that the write request of the virtual machine 1 is not to be interrupted by the write request of the virtual machine 2 VM2. Further, one example embodiment of the present disclosure allows the write request of the sequential pattern to bypass the write buffer. The average performance of one example embodiment of the present disclosure is similar to the conventional LRU scheme. This may mean that one example embodiment of the present disclosure does not negatively affect the performance of the SSD.

One example embodiment of the present disclosure exhibits 34% improvement in performance compared to the sequential write pattern of the write buffer using the conventional LRU policy. Further, the performance improvement for the sequential write may have also removed the situation in which the performance of the sequential write and the performance of the random write are reversed to each other when using the conventional write buffer. This means that the QoS (Quality of Service) of the virtual machine is guaranteed.

Figure 8:
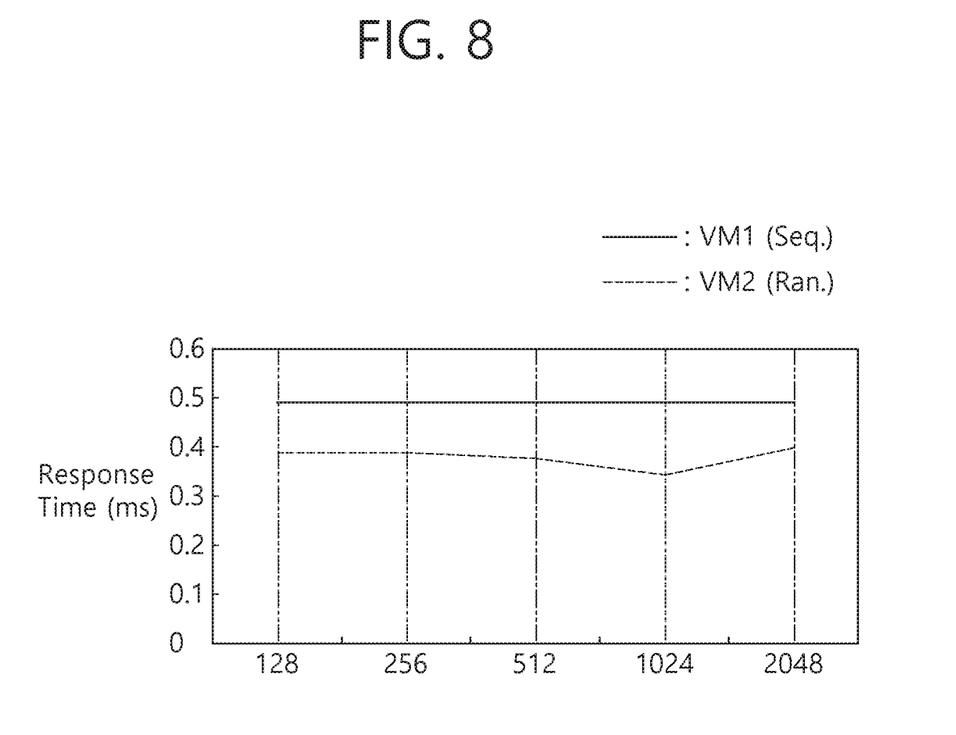
FIG. 8 is an illustration of experimental results based on threshold changes in one example embodiment of the present disclosure.

FIG. 8 is an illustration of experimental results with threshold changes in one example embodiment of the present disclosure.

As shown in FIG. 8, the performance of one example embodiment of the present disclosure differs depending on the thresholds used to classify the patterns of the write requests sent from the host. The response time of the virtual machine 1 VM1 decreases gradually to 10% until the threshold reaches 1024. However, changing the threshold from 1024 to 2048 increases the response time by up to 24%. In other words, from a result of experiments with changing the threshold, the highest performance could be measured when the threshold was 1024. Thus, the threshold may be set to 1024. This means that the performance of the embodiment of the present disclosure may be better in a certain range. Thus, in the embodiment of the present disclosure, the threshold may be selected from the certain range.

Thus, in one example embodiment of the present disclosure, there is proposed a novel write buffer management scheme for mitigating the write interference problem on SSDs and satisfying the I/O performance SLO of each VM in the home cloud server. The conventional storage reflects the write requests on the flash memory regardless of the type of write pattern, sequential one or random one. For this reason, the storage may return the performance of random write pattern although a VM transfers the write requests with sequential pattern. To address this problem, the Present invention checks the size of the write requests before allocating them to the write buffer, and then it makes some write requests bypass the write buffer according to the size of them. By doing so, the sequential write pattern is not interfered from the random write pattern. The experimental results clearly show that the Present invention outperforms the conventional scheme in terms of the I/O performance SLO without any negative impact on the performance of SSD.

Embodiments of the present disclosure may efficiently improve SLO (Service Level Objective) of each virtual machine by applying a new write buffer policy to a write buffer in a storage apparatus to mitigate performance degradation due to I/O interference between the virtual machines.

Further, embodiments of the present disclosure may prevent the write interference between the virtual machines by managing write buffers such that different policies are applied based on write patterns of the virtual machines, to guarantee the SLO of each virtual machine and increase the overall performance of the virtual machine.

An embodiment of the present disclosure may prevent write interference between virtual machines by allowing data having a size in excess of the threshold to bypass the write buffer.

An embodiment of the present disclosure may guarantee the performance of the sequential write and guarantee the SLO of each virtual machine.

An embodiment of the present disclosure may improve the performance of the entire virtualized system and increase the write buffer utilization.

The method of operating the storage apparatus in the virtualized system according to the embodiment of the present disclosure as described above may be implemented using a computer readable code on a computer readable recording medium. The method for operating a storage apparatus in a virtualized system according to an embodiment of the present disclosure may be implemented in the form of a program instruction that may be executed via various computer means and may be recorded on a computer readable recording medium.

A computer-readable recording medium storing the program for causing a computer to execute a method for operating a storage apparatus in a virtualized system according to an embodiment of the present disclosure may contain instructions for receiving a write request from a virtual machine, for comparing a write data size indicated by the received write request with a predetermined threshold to identify a write pattern of the received write request, and for allocating the received write requests differently according to the distinguished write patterns.

The computer readable recording medium may include all kinds of recording media storing data that may be decoded by the computer system. For example, the computer readable recording medium may include a ROM (Read Only Memory), a RAM (Random Access Memory), a magnetic tape, a magnetic disk, a flash memory, an optical data storage apparatus, etc. Further, the computer-readable recording medium may be stored and executed using codes distributed in computer systems connected to a computer network and readable in a distributed manner.

While the present invention has been described with reference to exemplary embodiments, it is to be understood that the invention is not limited to the disclosed exemplary embodiments. It will be understood by those skilled in the art that various changes in form and details may be made therein without departing from the spirit and scope of the present disclosure as set forth in the following claims.

Specifically, the features as described may be executed in digital electronic circuitry, or in computer hardware, firmware, or combinations thereof. The features may be executed, for example, in a computer program product implemented in a machine-readable storage apparatus for execution by a programmable processor. The features may be performed by a programmable processor that executes a program of instructions to perform the functions of the described embodiments by operating on input data and generating an output. The described features may be executed in one or more computer programs that may be executed on a programmable system including at least one input device, at least one output device and at least one programmable processor to receive data and instructions from a data storage system, and to transfer data and instructions to the data storage system. The computer program includes a set of instructions that may be used directly or indirectly within a computer to perform a particular operation on a predetermined result. The computer program may be written in any form of programming language, including compiled or interpreted languages, and may be implemented as a module, element, subroutine, or other unit suitable for use in a computer environment.

Suitable processors for the execution of a program of instructions include, for example, both general purpose and special purpose microprocessors, and one of a single processor or multiple processors for different types of computers. Further, storage apparatus suitable for implementing computer program instructions and data embodying the described features may include, for example, all forms of nonvolatile memory including semiconductor memory devices such as EPROM, EEPROM, and flash memory devices, magnetic memory devices such as internal hard disks, and removable disks, magneto-optical disks and CD-ROM and DVD-ROM discs. The processor and memory may be integrated within the ASICs (application-specific integrated circuits) or added to ASICs.

The present disclosure as described above is based on a series of functional blocks, but is not limited to the above-described embodiments and accompanying drawings. It will be apparent to those of ordinary skill in the art to which the present disclosure pertains that various changes and modifications may be made without departing from the technical idea of the present disclosure.

The combination of the above-described embodiments is not limited to the above-described embodiments, and the above-described embodiments and various combinations thereof may be provided depending on the implementation and/or necessity.

In the above-described embodiments, the methods are described on the basis of a flowchart including a series of operations or blocks, but the present disclosure is not limited to the order of operations. Some operations may occur concurrently or in a different order from the order the operations as described above. Further, those skilled in the art will recognize that the operations depicted in the flowchart are not exclusive, that other operations may be included, or that one or more operations in the flowchart may be deleted without affecting the scope of the present disclosure.

The foregoing embodiments include examples of various aspects. While not every possible combination may be described to describe various aspects, one of ordinary skill in the art will recognize that other combinations are possible. Accordingly, the present disclosure will include all alternatives, modifications and variations that fall within the scope of the following claims.

While the present invention has been described with reference to exemplary embodiments, it is to be understood that the invention is not limited to the disclosed exemplary embodiments. It will be understood by those skilled in the art that various changes in form and details may be made therein without departing from the spirit and scope of the present disclosure as set forth in the following claims.

What is claimed is:

1. A method for operating a storage apparatus having a write buffer, the method comprising:

receiving a write request from a virtual machine;
determining a remaining capacity in the write buffer;
identifying, based on a result of the determining of the remaining capacity, a write pattern corresponding to the received write request by comparing a write data size indicated by the write request with a predetermined threshold; and
determining whether to allow the write request to bypass the write buffer based on the identified write pattern.

2. The method of claim 1, further comprising, when data related to the received write request is stored in the write buffer, allocating the received write request to a storage location of the data.

3. The method of claim 2, further comprising, in response to the remaining capacity being present in the write buffer, allocating the received write request to the write buffer.

4. The method of claim 1, wherein the identifying of the write pattern is executed when the remaining capacity is absent in the write buffer.

5. The method of claim 1, wherein the identifying of the write pattern includes:
in response to the write data size indicated by the write request exceeding the predetermined threshold, identifying the write pattern corresponding to the received write request as a sequential write pattern.

6. The method of claim 5, wherein allocating of the received write request includes:
in response to the write pattern corresponding to the write request being identified as the sequential write pattern, allowing the received write request to bypass the write buffer and to be allocated to a memory of the storage apparatus.

7. The method of claim 1, wherein the identifying of the write pattern corresponding to the received write request includes:
in response to the write data size indicated by the received write request being less than or equal to the predetermined threshold, identifying the write pattern corresponding to the received write request as a random write pattern.

8. The method of claim 7, wherein the allocating of the received write request includes:
in response to the write pattern corresponding to the received write request being identified as the random write pattern, allocating the received write request to the write buffer.

9. The method of claim 7, wherein the allocating of the received write request includes:
in response to the write pattern corresponding to the received write request being identified as the random write pattern, deleting data pre-stored in the write buffer and allocating the received write request to a location of the deleted data in the buffer.

10. The method of claim 7, wherein the allocating of the received write request includes:
in response to the write pattern corresponding to the received write request being identified as the random write pattern and when the write buffer is based on Least Recently Used (LRU) policy, deleting data in a LRU position in the write buffer, and allocating the received write request to the LRU position of the deleted data.

11. A storage apparatus in a virtualized system, the apparatus comprising:
a write buffer;
a memory; and
a controller for controlling the write buffer and the memory, wherein the controller is configured to:
receive a write request from a virtual machine;
identify, when a remaining capacity is absent in the write buffer, a write pattern corresponding to the received write request by comparing a write data size indicated by the write request with a predetermined threshold; and
allocate the received write request differently based on the identified write pattern.

12. The apparatus of claim 11, wherein the controller is further configured to, in response to data related to the received write request being stored in the write buffer, allocate the received write request to a storage location of the data.

13. The apparatus of claim 12, wherein the controller is further configured to, in response to a remaining capacity being present in the write buffer, allocating the received write request to the write buffer.

14. The apparatus of claim 11, wherein the controller is further configured to, in response to the write data size indicated by the write request exceeding the predetermined threshold, identifying the write pattern corresponding to the received write request as a sequential write pattern.

15. The apparatus of claim 14, wherein the controller is further configured to, in response to the write pattern corresponding to the received write request being identified as the sequential write pattern, allowing the received write request to bypass the write buffer and to be allocated to the memory.

16. The apparatus of claim 11, wherein the controller is further configured to, in response to the write data size indicated by the received write request being less than or equal to the predetermined threshold, identifying the write pattern corresponding to the received write request as a random write pattern.

17. The apparatus of claim 16, wherein the controller is further configured to, in response to the write pattern corresponding to the received write request being identified as the random write pattern, allocating the received write request to the write buffer.

18. The apparatus of claim 16, wherein the controller is further configured to, in response to the write pattern corresponding to the received write request being identified as the random write pattern, deleting data pre-stored in the write buffer and allocating the received write request to a location of the deleted data in the buffer.

19. A virtualized system, comprising:
a host operated by a host operating system;
a virtual machine operated by a guest operating system, wherein the guest operating system operates on top of the host operating system;
a hypervisor located between the virtual machine and the host for controlling the guest operating system accessing a resource of the host operating system; and
a storage apparatus having a write buffer and a memory, wherein the storage apparatus is configured to:
receive a write request from a virtual machine;
identify, when the write buffer is full, a write pattern corresponding to the received write request by comparing a write data size indicated by the write request with a predetermined threshold; and
allocate the received write request based on the identified write pattern.

* * * * *